United States Patent
Yokoyama et al.

(10) Patent No.: US 8,045,063 B2
(45) Date of Patent: Oct. 25, 2011

(54) APPARATUS, METHOD, AND COMPUTER PROGRAM FOR PROCESSING IMAGE, AND RECORDING MEDIUM STORING THE COMPUTER PROGRAM

(75) Inventors: Kazuki Yokoyama, Kanagawa (JP); Tetsuji Inada, Tokyo (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1273 days.

(21) Appl. No.: 11/652,538

(22) Filed: Jan. 12, 2007

(65) Prior Publication Data

US 2007/0182834 A1    Aug. 9, 2007

(30) Foreign Application Priority Data

Jan. 16, 2006    (JP) ................ P2006-007203

(51) Int. Cl.
*H04N 5/14*    (2006.01)
(52) U.S. Cl. ......... 348/673; 348/625; 348/627; 348/679
(58) Field of Classification Search .................. 348/671, 348/673–676, 252–255, 622–625, 627, 707, 348/678–679; 382/260–265; *H04N 5/14*
See application file for complete search history.

(56) References Cited

U.S. PATENT DOCUMENTS

| | | | |
|---|---|---|---|
| 5,262,863 A * | 11/1993 | Okada ........................... 348/679 |
| 7,456,873 B2 * | 11/2008 | Kohashi et al. ............... 348/235 |
| 2004/0091145 A1 | 5/2004 | Kohashi et al. | |

FOREIGN PATENT DOCUMENTS

| | | |
|---|---|---|
| EP | 1 137 267 A2 | 9/2001 |
| EP | 1 496 472 A2 | 1/2005 |
| JP | 2001-298621 | 10/2001 |
| JP | 2002-300402 | 10/2002 |
| JP | 2004-289607 | 10/2004 |
| JP | 2005-033688 | 2/2005 |
| JP | 2005-301910 | 10/2005 |
| JP | 2005-309945 | 11/2005 |

* cited by examiner

*Primary Examiner* — Trang U Tran
(74) *Attorney, Agent, or Firm* — Finnegan, Henderson, Farabow, Garrett & Dunner, L.L.P.

(57) ABSTRACT

An image processing apparatus includes a non-linear smoother for smoothing input video data with an edge component thereof preserved, and outputting smoothed video data, a subtractor for subtracting the smoothed video data from the input video data and outputting high-frequency component video data not containing the edge component, an outline extractor for extracting the edge component from the smoothed video data and outputting edge component video data, a first amplifier for varying a signal level of the edge component video data, a second amplifier for varying a signal level of the high-frequency component video data not containing the edge component, and an adder for adding video data output from the first amplifier and video data output from the second amplifier to one of the smoothed video data and the input video data.

5 Claims, 10 Drawing Sheets

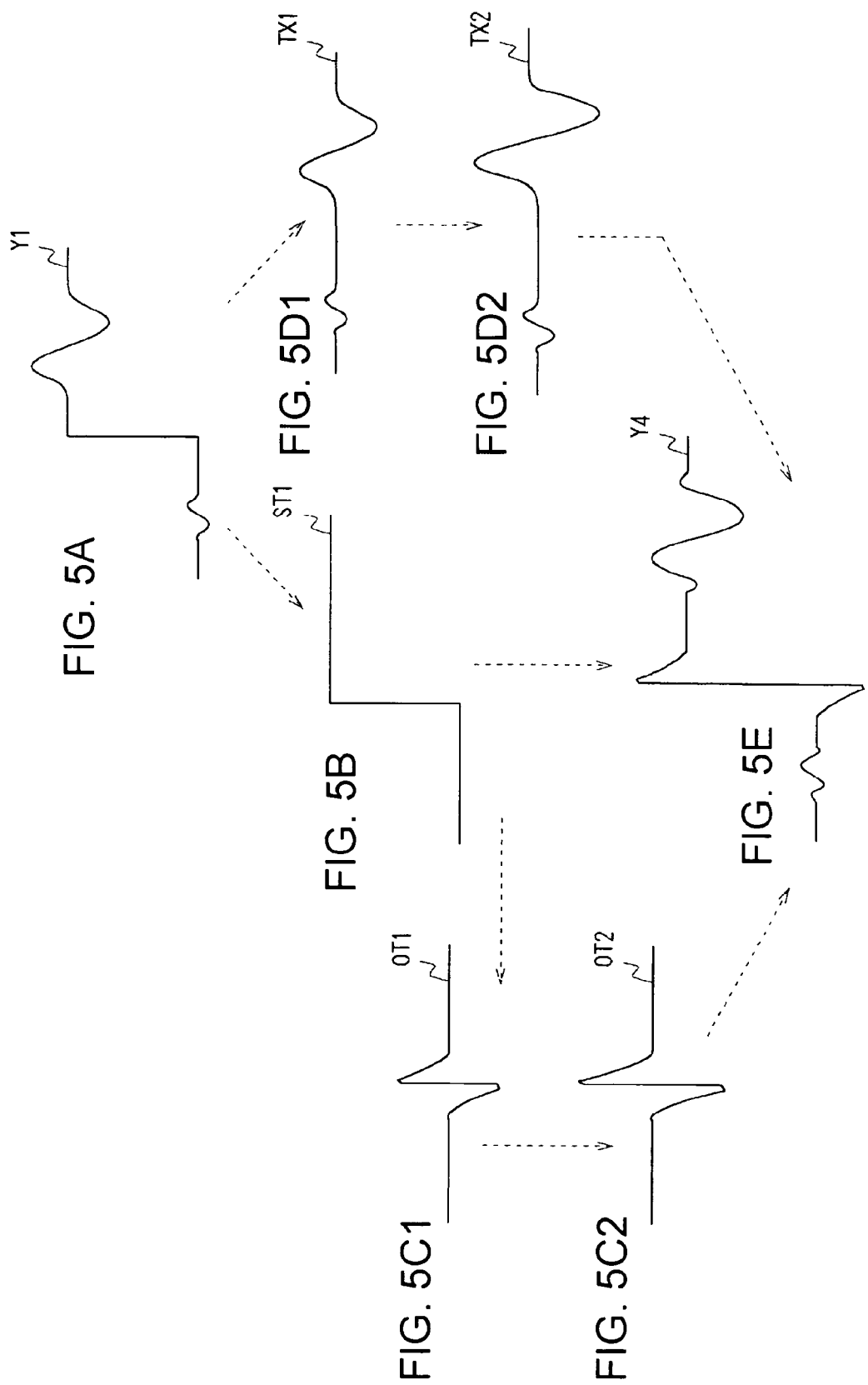

PRIOR ART

PRIOR ART

PRIOR ART

APPARATUS, METHOD, AND COMPUTER PROGRAM FOR PROCESSING IMAGE, AND RECORDING MEDIUM STORING THE COMPUTER PROGRAM

CROSS REFERENCES TO RELATED APPLICATIONS

The present invention contains subject matter related to Japanese Patent Application JP 2006-007203 filed in the Japanese Patent Office on Jan. 16, 2006, the entire contents of which are incorporated herein by reference.

BACKGROUND OF THE INVENTION

1. Field of the Invention

The present invention relates to an apparatus, method, computer program, and recording medium for processing an image for use in an image pickup apparatus, for example. In particular, the present invention relates to a technique that outline enhances input video data in a manner free from image degradation by separating an edge component from a smoothing process result of the input video data with an edge component thereof preserved, and by adjusting a level of the input video data.

2. Description of the Related Art

Video apparatuses for processing a variety of video data enhance an outline in a corresponding image with an outline enhancing circuit to improve image quality.

FIG. 7 is a block diagram of a typical known outline enhancing circuit 1. In the outline enhancing circuit 1, a sharpness component extractor 2, including a high-pass filter for example, extracts and outputs a high-frequency component from input video signal Y1, thereby extracting a component for use in an outline enhancement process. An amplifier 3 amplifies the high-frequency component with a predetermined gain, and outputs the amplified component. An adder 4 adds the output signal from the amplifier 3 to the original video signal Y1, thereby enhancing the outline of a video signal Y2 with the edge component thereof enhanced as shown in FIGS. 8A and 8B.

Japanese Unexamined Patent Application Publication No. 2001-298621 discloses a technique of improving contrast and sharpness. As shown in FIG. 9, in an image processing circuit 6 related to the disclosed technique, a separator 7 limits the bandwidth of a luminance signal Y1 with a non-linear filter, thereby smoothing the luminance signal Y1 with an edge component thereof preserved, and outputting a luminance signal ST1 as shown in FIGS. 10A and 10B. The separator 7 subtracts the smoothed luminance signal ST1 from the luminance signal Y1, thereby extracting a high-frequency component TX1 not containing the edge component as shown in FIG. 10C. The non-linear filter is a two-dimensional ϵ filter, for example.

An amplifier 8 in the image processing circuit 6 amplifies the high-frequency component TX1 not containing the edge component with a predetermined gain and outputs the amplified high-frequency component TX2. An adder 9 adds the output signal TX2 from the amplifier 8 to the smoothed luminance signal ST1 output from the separator 7, and thus outputs a luminance signal Y3 with an edge component removed therefrom and the high-frequency component enhanced. Since the edge component is not processed at all in this method, enhancement is performed with the occurrence of pre-shooting and over-shooting controlled.

The known outline enhancing circuit of FIG. 7 enhances a high-frequency component other than the edge component, thereby enhancing a noise component. This process makes noise pronounced, leading to image quality degradation.

So-called coring process may be contemplated to remove noise component. If a noise component and a variation in signal level, each having a level higher than a coring level, are superimposed on an edge, etc., these signals cannot be removed. This technique has room for improvement.

SUMMARY OF THE INVENTION

It is desirable to provide an apparatus, method, computer program, and recording medium for enhancing an outline of an image with image degradation reduced.

In accordance with one embodiment of the present invention, an image processing apparatus includes a non-linear smoother for smoothing input video data with an edge component thereof preserved, and outputting smoothed video data, a subtractor for subtracting the smoothed video data from the input video data and outputting high-frequency component video data not containing the edge component, an outline extractor for extracting the edge component from the smoothed video data and outputting edge component video data, a first amplifier for varying a signal level of the edge component video data, a second amplifier for varying a signal level of the high-frequency component video data not containing the edge component, and an adder for adding video data output from the first amplifier and video data output from the second amplifier to one of the smoothed video data and the input video data.

In accordance with one embodiment of the present invention, an image processing method includes steps of smoothing input video data with an edge component thereof preserved, and outputting smoothed video data, subtracting the smoothed video data from the input video data and outputting high-frequency component video data not containing the edge component, extracting the edge component from the smoothed video data and outputting edge component video data, varying in level the edge component video data, varying in level the high-frequency component video data not containing the edge component, and adding the level-varied edge component video data and the level-varied high-frequency component video data not containing the edge component to one of the smoothed video data and the input video data.

In accordance with one embodiment of the present invention, a computer program for causing a compute to process input image data, includes steps of smoothing input video data with an edge component thereof preserved, and outputting smoothed video data, subtracting the smoothed video data from the input video data and outputting high-frequency component video data not containing the edge component, extracting the edge component from the smoothed video data and outputting edge component video data, varying in level the edge component video data, varying in level the high-frequency component video data not containing the edge component, and adding the level-varied edge component video data and the level-varied high-frequency component video data not containing the edge component to one of the smoothed video data and the input video data.

In accordance with one embodiment of the present invention, a recording medium stores a computer program for causing a compute to process input image data. The computer program includes steps of smoothing input video data with an edge component thereof preserved, and outputting smoothed video data, subtracting the smoothed video data from the input video data and outputting high-frequency component video data not containing the edge component, extracting the edge component from the smoothed video data and outputting edge component video data, varying in level the edge component video data, varying in level the high-frequency component video data not containing the edge component, and adding the level-varied edge component video data and the level-varied high-frequency component video data not containing the edge component to one of the smoothed video data and the input video data.

In accordance with embodiments of the present invention, the image processing apparatus includes the non-linear smoother for smoothing input video data with an edge component thereof preserved, and outputting smoothed video data, the subtractor for subtracting the smoothed video data from the input video data and outputting high-frequency component video data not containing the edge component, the outline extractor for extracting the edge component from the smoothed video data and outputting the edge component video data, the first amplifier for varying the signal level of the edge component video data, the second amplifier for varying the signal level of the high-frequency component video data not containing the edge component, and the adder for adding video data output from the first amplifier and video data output from the second amplifier to one of the smoothed video data and the input video data. The edge component is level adjusted independently with noise intrusion prevented. Outline enhancement is thus performed with image degradation controlled.

Embodiments of the present invention thus provide a method, program, and recording medium for enhancing the outline of image with image degradation controlled.

BRIEF DESCRIPTION OF THE DRAWINGS

FIGS. 5A-5E are waveform diagrams illustrating operation of the image processing circuit of FIG. 1;

DESCRIPTION OF THE PREFERRED EMBODIMENTS

Figure 2:
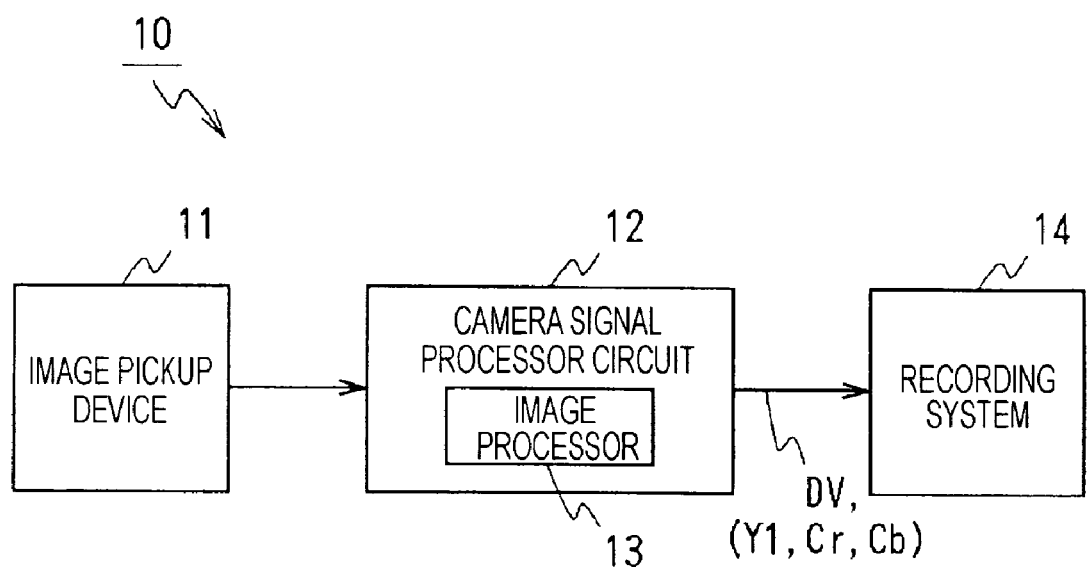
FIG. 2 is a block diagram illustrating the image pickup apparatus in accordance with one embodiment of the present invention.

FIG. 2 is a block diagram of an image pickup apparatus 10 as an image processing apparatus in accordance with one embodiment of the present invention. In the image pickup apparatus 10, an image pickup device 11 is a charge coupled device or solid-state image pickup device and outputs an optical image pickup result focused on an imaging surface through a lens (not shown).

A camera signal processor circuit 12 performs a calculation process, an analog-to-digital conversion process, a gamma correction process, a white-balance process, and other processes on the image pickup result output from the image pickup device 11, and then outputs video data DV composed of luminance data Y1, and color difference data Cr and Cb. In this series of processes, an image processor 13 in the camera signal processor circuit 12 outputs the video data VD with image outline enhanced and contrast and sharpness improved.

The image pickup apparatus 10 displays on display means a monitor image of the video data VD output from the camera signal processor circuit 12. In response to a user operation input, a recording system 14 compresses the video data VD and records the compressed video data VD onto one of recording media. The recording media include an optical disk, a magneto-optical disk, a magnetic tape, and a memory card.

Figure 1:
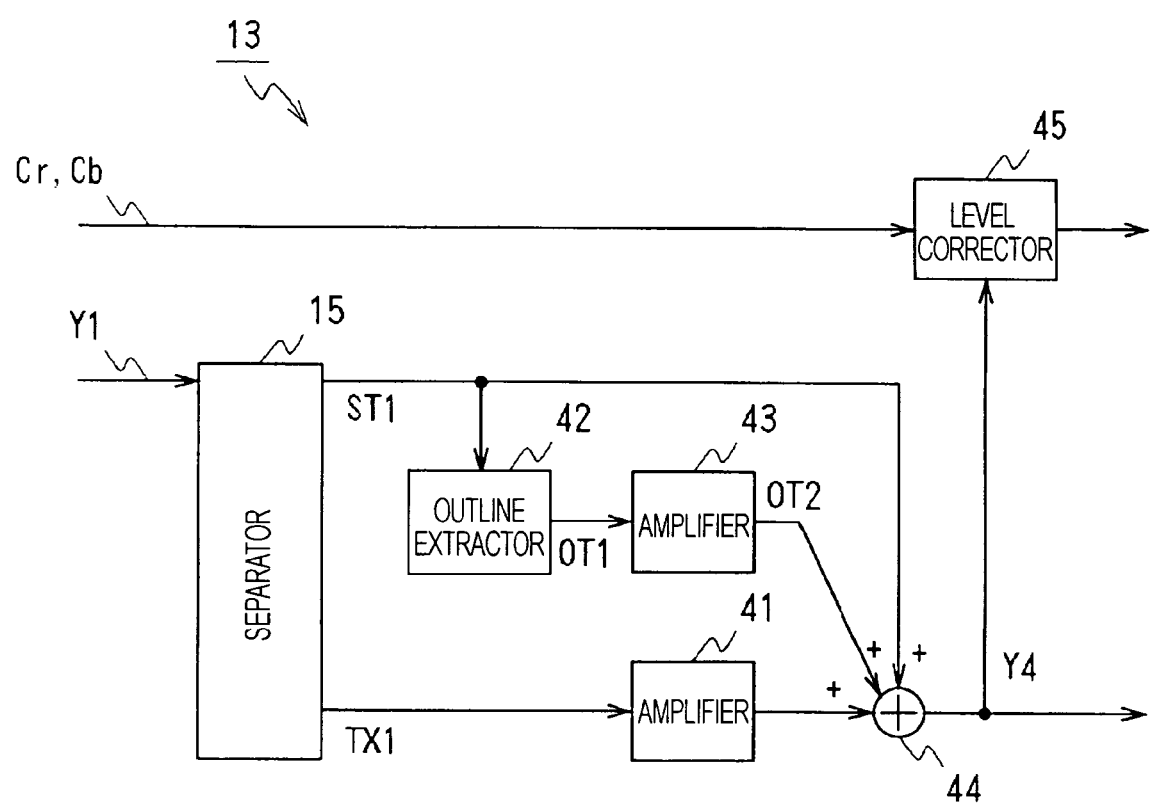
FIG. 1 is a block diagram of an image processing circuit in an image pickup apparatus in accordance with one embodiment of the present invention.

FIG. 1 is a block diagram of the image processor 13 used in the image pickup apparatus 10. The secondary power monitor 13 enhances an outline in input video data composed of luminance data Y1, and color difference data Cr and Cb, and further improves contrast and sharpness of image. A separator 15 in the image processor 13 smoothes luminance data ST1 with an edge component preserved, and then outputs the smoothed luminance data ST1. The separator 15 also subtracts the smoothed luminance data ST1 from the original luminance data Y1, thereby outputting a high-frequency component TX1 containing no edge component.

Figure 3:
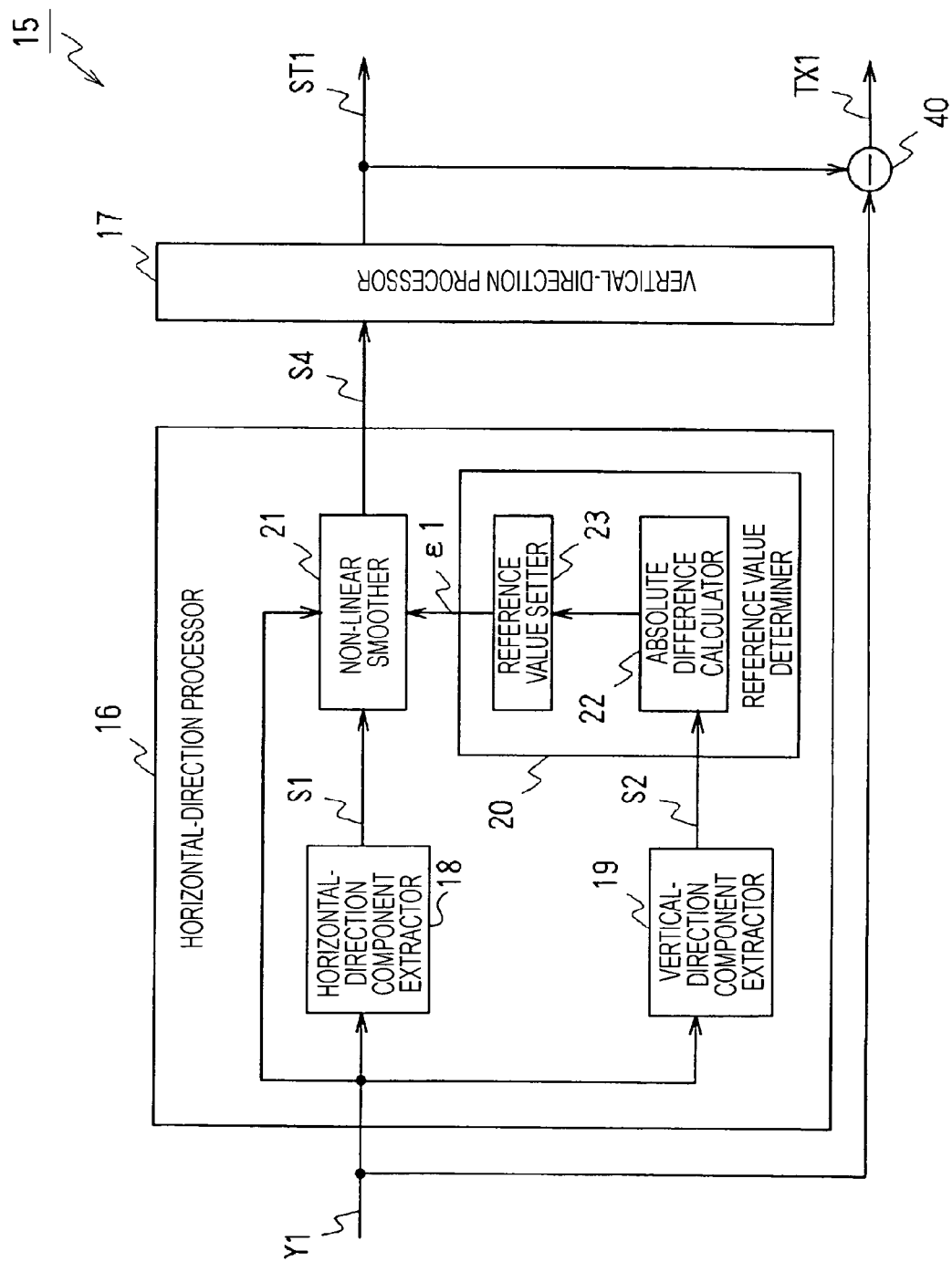
FIG. 3 is a block diagram illustrating a separator in the image processing circuit of FIG. 1.

FIG. 3 is a block diagram of the separator 15. The separator 15 includes a horizontal-direction processor 16 and a vertical-direction processor 17. The horizontal-direction processor 16 smoothes the luminance data Y1 in a horizontal direction and then the vertical-direction processor 17 smoothes luminance data in a vertical direction.

The image processor 13 successively inputs to a horizontal-direction component extractor 18 the luminance data Y1 from a buffer memory (not shown) in a raster sequence. The horizontal-direction component extractor 18 successively delays the luminance data Y1 through a shift register having a predetermined number of stages. The horizontal-direction component extractor 18 outputs to a non-linear smoother 21 a plurality of samples of luminance data S1 from the shift register at a time in parallel. The plurality of luminance data S1 is composed of data at a target sampling point and a plurality of sampling points in front of and behind the target sampling point in a horizontal direction. In this way, the horizontal-direction component extractor 18 outputs the luminance data S1 at the plurality of sampling points to the non-linear smoother 21 for smoothing process.

A vertical-direction component extractor 19 receives and then transfers the luminance data Y1 at a line buffer having a plurality of stages connected in cascade, and outputs the luminance data Y1 respectively output from the line buffers to a reference value determiner 20. In this way, the vertical-direction component extractor 19 outputs luminance data S2 at a target sampling point of the horizontal-direction component extractor 18 and a plurality of sampling points above and below the target sampling point in a vertical direction to the reference value determiner 20.

The reference value determiner 20 detects a variation in the sample values at the sampling points adjacent to the target sampling point from the luminance data S2 at the sampling points consecutively arranged in a vertical direction output from the vertical-direction component extractor 19. In response to the magnitude of variation in the sample values, the reference value determiner 20 determines a reference value ∈1 to be supplied for a non-linear smoothing process. The reference value determiner 20 thus sets the reference value ϵ1 so that the non-linear smoother 21 appropriately performs the smoothing process.

An absolute difference calculator 22 in the reference value determiner 20 receives the luminance data S2 at the plurality of sampling points consecutively arranged in a vertical direction output from the vertical-direction component extractor 19. The absolute difference calculator 22 subtracts the luminance data at the target sampling point from the luminance data at a next sampling point, and then converts the resulting difference into an absolute difference. The absolute difference calculator 22 detects absolute differences at the plurality of sampling points consecutively arranged in a vertical direction with respect to the target sampling point.

A reference value setter 23 detects a maximum value from among the plurality of absolute differences at the plurality of sampling points consecutively arranged in a vertical direction detected by the absolute difference calculator 22, and adds a constant margin to the maximum absolute difference as the reference value ϵ1. For example, the reference value setter 23 sets 10% as a margin, thereby setting 1.1 times the maximum absolute difference as the reference value ϵ1.

The non-linear smoother 21 performs a non-linear smoothing process on the luminance data S1 at the plurality of sampling points consecutively arranged in a horizontal direction output from the horizontal-direction component extractor 18, with respect to the reference value ϵ1. In this process, the non-linear smoother 21 weight-averages the smooth process result and the original luminance data Y1 to compensate for a weak edge component that is lost in the smoothing process, and outputs the averaged result.

Figure 4:
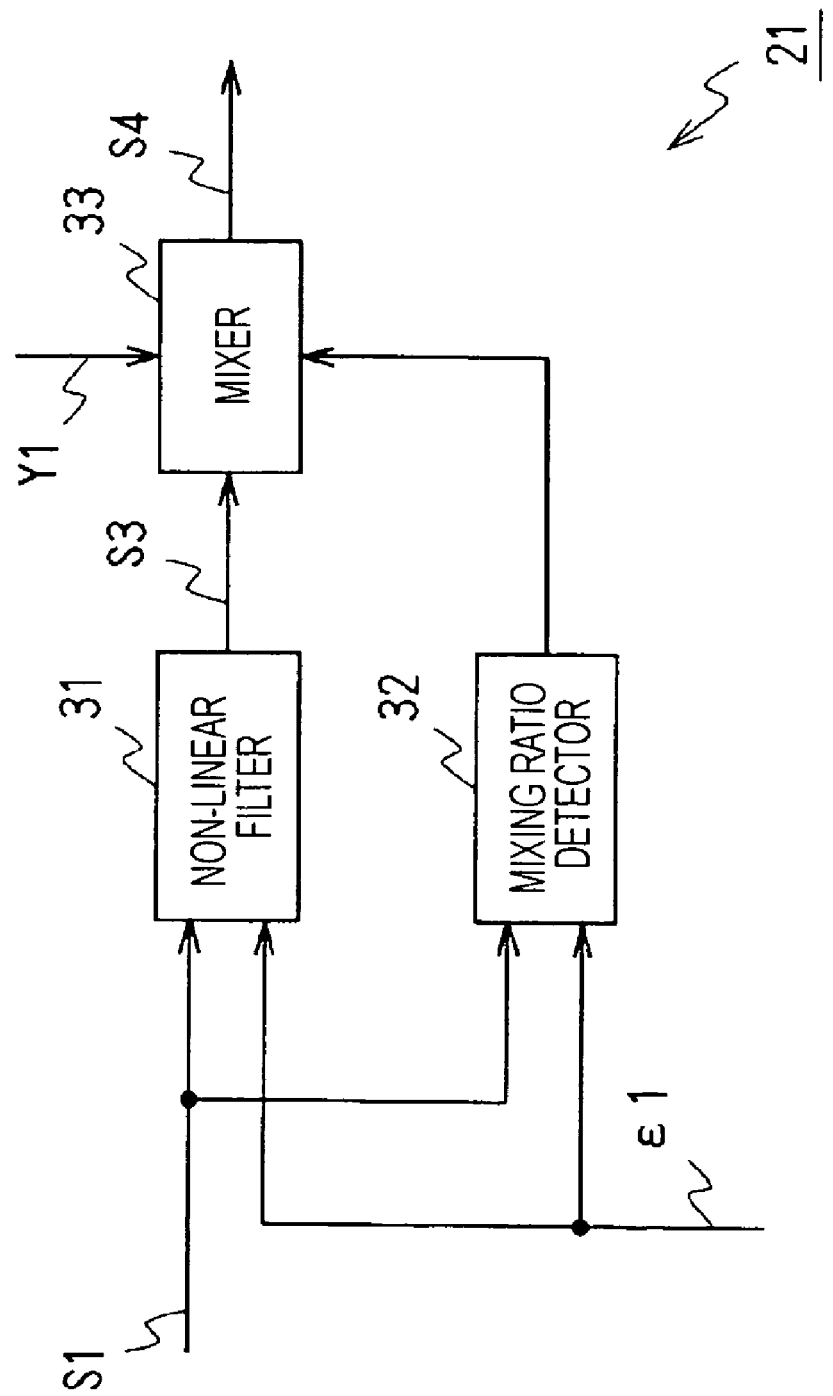
FIG. 4 is a block diagram illustrating a non-linear smoothing circuit in the separator of FIG. 3.

As shown in FIG. 4, a non-linear filter 31 in the non-linear smoother 21 is an ϵ filter. The non-linear filter 31 performs a non-linear smoothing process on the luminance data S1 at the plurality of sampling points consecutively arranged in a horizontal direction output from the horizontal-direction component extractor 18 with respect to the reference value ϵ1 output from the reference value determiner 20. The non-linear filter 31 thus smoothes the luminance data Y1 with a component varying greatly beyond the reference value ϵ1 preserved. The non-linear filter 31 stores a signal level that greatly varies beyond the reference value ϵ1. The reference value ϵ1 is determined based on the variation in the sample values in a vertical direction. The non-linear filter 31 thus performs a non-linear smoothing process on the luminance data Y1 in a horizontal direction.

A mixer 33 weight averages luminance data S3 output from the non-linear filter 31 and the original luminance data Y1 using weight coefficients calculated by a mixing ratio detector 32, and outputs luminance data S4.

The mixing ratio detector 32 detects a variation in the signal level at a sampling point adjacent to the target sampling point in a horizontal direction with respect to a signal level at the target sampling point, from the luminance data S1 at the plurality of sampling points consecutively arranged in a horizontal direction output from the horizontal-direction component extractor 18. The mixing ratio detector 32 also detects the presence of a weak edge based on the detected variation in the signal level. Based on the detection result, the mixing ratio detector 32 further calculates the weight coefficient for use in the weight averaging process of the mixer 33.

More specifically, the mixing ratio detector 32 determines a certain percentage of the reference value 81 detected in the vertical direction by the reference value determiner 20 or subtracts a certain value from the reference value ϵ1, as a reference value ϵ2 smaller than the reference value ϵ1. The reference value ϵ2 is set up so that a weak edge component smoothed through the non-linear smoothing process using the reference value ϵ1 is detected in comparison with an absolute difference to be discussed later. The reference value ϵ1 is set up depending on the variation in the signal level in a vertical direction.

The mixing ratio detector 32 receives the luminance data S1 at the plurality of sampling points consecutively arranged in a horizontal direction output from the horizontal-direction component extractor 18, and calculates successively the absolute differences, each absolute difference between the luminance data at the target sampling point and the luminance data at each of the sampling points adjacent to the target sampling point. The mixing ratio detector 32 determines that there is no weak edge if each of all calculated absolute differences is smaller than the reference value ϵ2.

If any of the calculated absolute differences is not lower than the reference value ϵ2, the mixing ratio detector 32 determines whether the sampling point having the reference value ϵ2 or higher is ahead of or behind the target sampling point and also determines the polarity of the difference of that sampling point. If there are sampling points having the reference value ϵ2 or higher both ahead of and behind the target sampling point, and if those sampling points have the same polarity, the sample value may temporarily increase due to noise. The mixing ratio detector 32 thus determines that there is no weak edge.

If the sampling point having the reference value ϵ2 or higher is present ahead of or behind the process sampling rather than on both sides of the target sampling point, or if the sampling points, present on both sides of the target sampling point, provides the difference values different in polarity, the sample value changes slightly across the target sampling point. The mixing ratio detector 32 determines that there is a weak edge.

If it is determined that there is a weak edge, the mixing ratio detector 32 determines the weight coefficient to be used in the weight averaging process of the mixer 33 so that the original luminance data Y1 is selectively output.

If it is determined that there is no weak edge, the weight coefficient to be used in the weight averaging process of the mixer 33 is set so that the component of the luminance data S3 obtained through the non-linear smoothing process is increased in luminance data S4 output from the mixer 33 in response to the maximum value of the absolute differences used to result in the reference value ϵ2. In the setting of the weight coefficient, the weight coefficient related to the luminance data S3 obtained through the non-linear smoothing process is linearly increased from a value 0 to a value 1 in proportion to the increase in the maximum value of the absolute difference. When the maximum value of the absolute difference rises above a constant value, only the luminance data S3 obtained through the non-linear smoothing process is selectively output. If it is determined that there is no edge, the mixing ratio detector 32 sets the weight to be larger in the smoothing process as a variation in the sample value becomes larger. The luminance data is output in this setting.

The horizontal-direction processor 16 performs the non-linear smoothing process on the luminance data Y1 in a horizontal direction so as to preserve a variation in the sample value equal to or larger than the variation in the sample values at the consecutive sampling points in a vertical direction. The horizontal-direction processor 16 detects an edge related to a variation in the sample value in the horizontal direction smaller than the variation in the sample values at the sampling points consecutively arranged in a vertical direction. If there is such a variation, the horizontal-direction processor 16 selectively outputs the original luminance data Y1. If there is no such a variation, the horizontal-direction processor 16 weight averages the luminance data S4 resulting from the non-linear smoothing process and the original luminance data Y1 in response to the magnitude of the variation in the sample value in the horizontal direction, and outputs the weight-averaged luminance data. The horizontal-direction processor 16 smoothes the luminance data Y1 in a horizontal direction with the weak edge component preserved.

Figure 7:
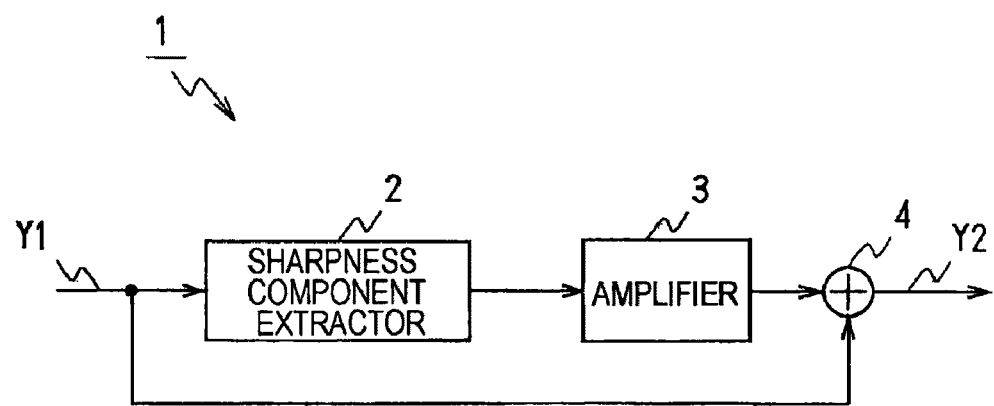
FIG. 7 is a block diagram illustrating a known outline enhancing circuit.
Figure 8A:
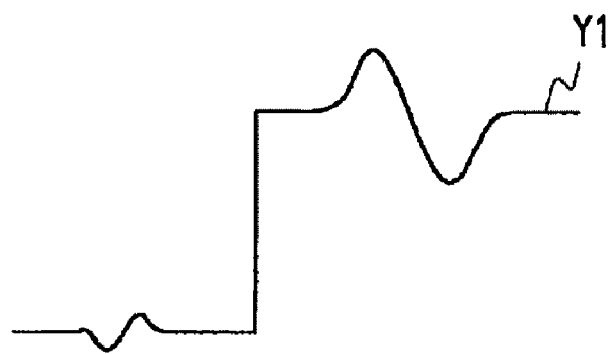
FIGS. 8A and 8B are waveform diagrams illustrating operation of the outline enhancing circuit.
Figure 8B:
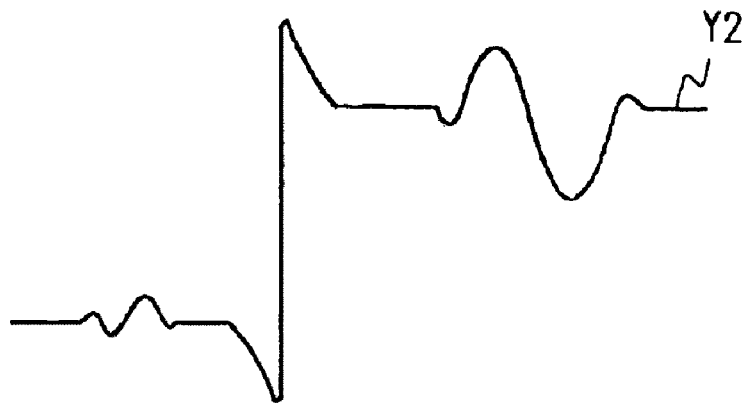
Figure 9:
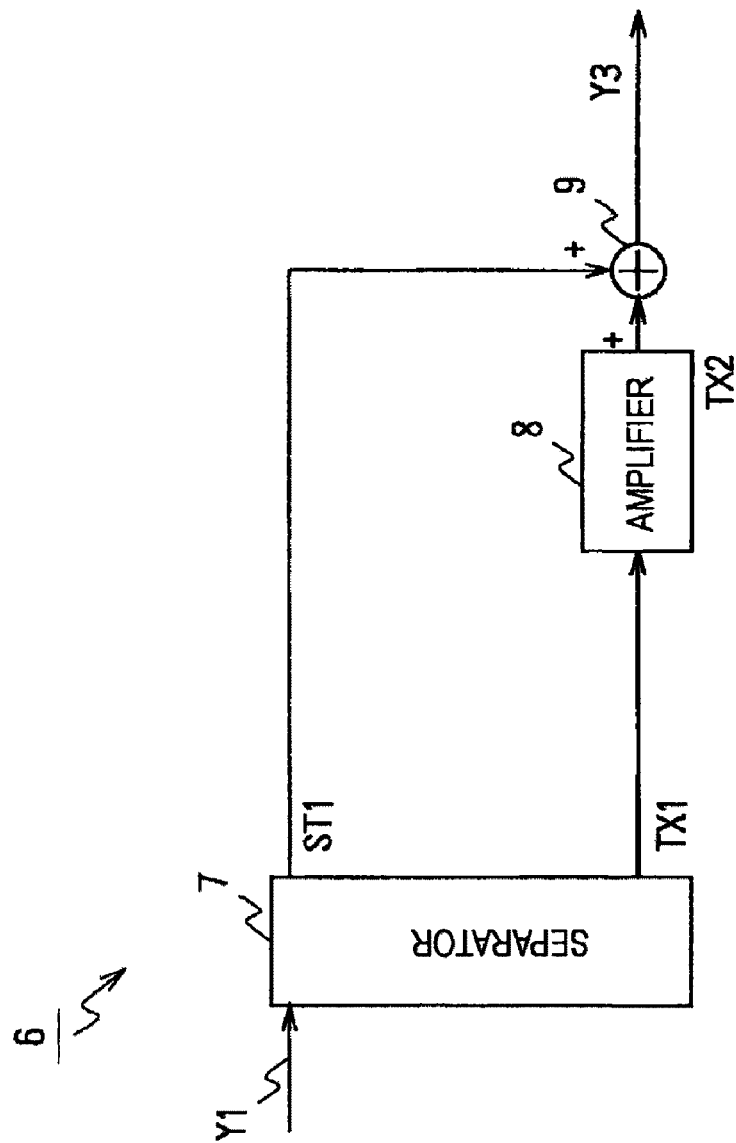
FIG. 9 is a block diagram illustrating an image processing circuit for enhancing contrast and sharpness.
Figure 10A:
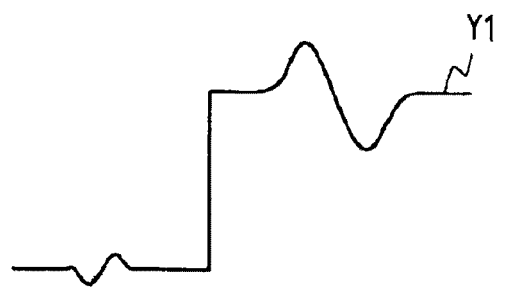
FIGS. 10A-10E are waveform diagrams illustrating operation of an image processing circuit of FIG. 9.
Figure 10B:
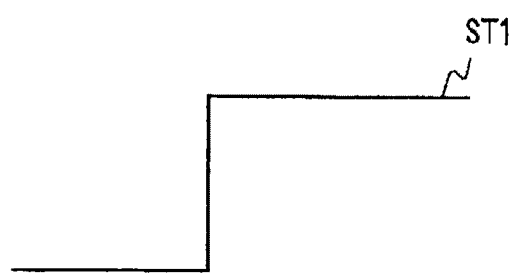
Figure 10C:
Figure 10D:
Figure 10E:
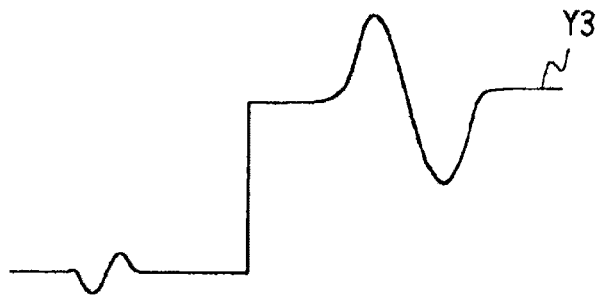

A vertical-direction processor 17 (FIG. 7) performs the vertical smoothing process on the luminance data S4 output from the horizontal-direction processor 16. The vertical-direction processor 17 performs the vertical non-linear smoothing process on the luminance data S4 so that a variation in the sample value equal to or larger than a variation in the sample values at the sampling points consecutively arranged in a horizontal direction is preserved. The vertical-direction processor 17 also detects an edge related to a variation in the sample value in a vertical direction smaller than the variation in the sample values at the sampling points arranged consecutively in a horizontal direction. If there is such an edge, the vertical-direction processor 17 selectively outputs the original luminance data S4. If there is no such an edge, the vertical-direction processor 17 weight averages the non-linear smoothing process result and the original luminance data S4 in response to the magnitude of the variation in the sample values in the vertical direction. The vertical-direction processor 17 thus vertically smoothes the luminance data Y1 with the weak edge component preserved.

In comparison of FIG. 5A with FIG. 5B, the separator 15 performs the non-linear smoothing process on the successively input luminance data Y1, thereby outputting luminance data ST1 as a two-dimensional smoothing process result with the edge component preserved. As shown in FIG. 5D1, a subtractor 40 subtracts the luminance data ST1 from the original luminance data Y1, thereby outputting luminance data TX1 containing the high-frequency component without the edge component.

In comparison of FIG. 5D1 with FIG. 5D2, the amplifier 41 (FIG. 1) amplifies the luminance data TX1 containing the high-frequency component without the edge component with a predetermined gain, thereby outputting the level-adjusted high-frequency component without the edge component.

In comparison of FIG. 5B with FIG. 5C1, an outline extractor 42 extracts an edge component from the luminance data ST1 obtained through the smoothing process of the separator 15 and outputs the extracted edge component. More specifically, the outline extractor 42, including a two-dimensional filter, successively calculates difference values between adjacent sampling points in one of a horizontal direction and a vertical direction, thereby detecting an edge component OT1 from an derivative of the luminance data ST1.

In comparison of FIG. 5C1 with FIG. 5C2, an amplifier 43 amplifies the edge component OTI with a predetermined gain, thereby outputting the level-adjusted OT2.

As shown in FIG. 5E, an adder 44 sums the luminance data ST1 output by the separator 15 in the smoothing process, the high-frequency component TX2 without the edge component output from the amplifier 41, and the edge component OT2 output from the amplifier 43, thereby outputting luminance data Y4.

A level corrector 45 adjusts the signal level of the color difference data Cr and Cb so that the ratio of the color difference data Cr and Cb to the luminance data Y4 as the process result equals the ratio of the color difference data Cr and Cb to the original luminance data Y1, and outputs the level-adjusted color difference data Cr and Cb. The level corrector 45 thus prevents hue of the image from being varied.

In the image pickup apparatus 10 (FIG. 2), the image pickup result obtained from the image pickup device 11 is processed by the camera signal processor circuit 12 in this way, and then displayed as a monitor image and recorded on the recording system 14 in response to an operational input from the user. The image processor 13 in the camera signal processor circuit 12 thus enhances the high-frequency component of the luminance data Y1, thereby improving image quality.

In the image processor 13 (FIG. 1), the separator 15 smoothes the luminance data Y1 with the edge component preserved, and the outline extractor 42 extracts the edge component from the smoothed luminance data ST1. The image processor 13 thus extracts the edge component OT1 by preventing effectively the intrusion of the high-frequency component other than the edge component.

When only the edge component is extracted from the luminance data Y1, the intrusion of the high-frequency component other than the edge component cannot be avoided. A noise component is also enhanced through the outline enhancement, leading to image degradation. However, when the edge component is extracted from the smoothing process result with the edge component preserved in accordance with the present embodiment, the noise component is prevented from intruding. The outline enhancement is thus performed without enhancing the noise component. The use of an $\epsilon$ filter permits the non-linear smoothing process to be performed with the edge component preserved. If the edge component is extracted from the smoothing process result containing the preserved edge component, the outline enhancement is performed with image degradation prevented. Even if a signal to noise (S/N) ratio is low, the outline enhancement is performed with image degradation controlled.

Figure 6A:
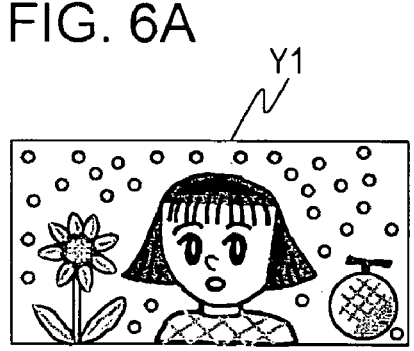
FIGS. 6A-6D illustrate how an outline of an image is extracted.
Figure 6C:
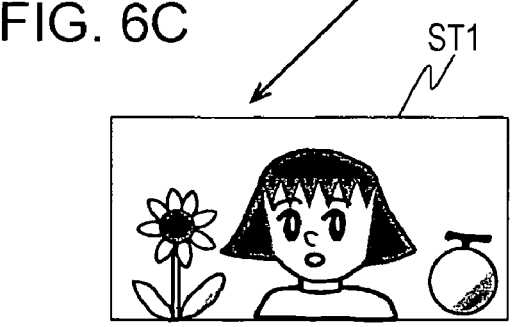
Figure 6D:
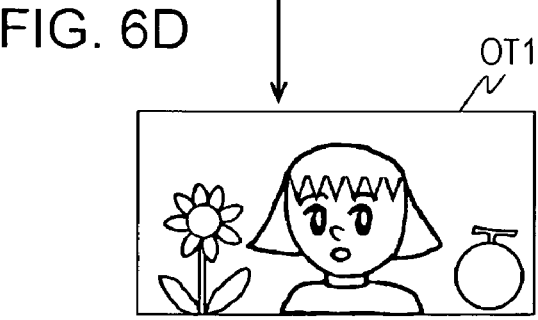
Figure 6B:
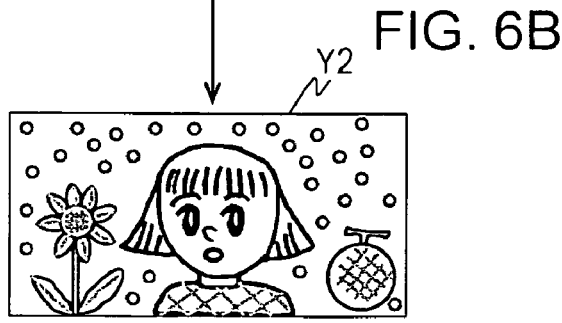

FIGS. 6A-6D illustrate images obtained through the high-frequency component extraction process of the present embodiment in contrast with images obtained through known high-frequency extraction process. In accordance with the known technique, a high-frequency component Y2 (FIG. 6B) is obtained by limiting bandwidth on an input image Y1 (FIG. 6A) with a high-pass filter. Contained in the high-frequency component Y2 is an edge component besides fine variations in luminance of an image including head hair, clothes, a fine structure of a flower, etc. Similarly, a noise component is contained in the high-frequency component Y2. In contrast, if the smoothing process is performed using a non-linear smoothing filter with the edge component preserved in accordance with the present embodiment of the present invention, the edge component is extracted as shown in FIG. 6C with mean luminance level of each portion of the input image Y1 (FIG. 6A) preserved. More specifically, in the smoothing process result ST1, the fine variations in luminance of an image including head hair, clothes, a fine structure of a flower, etc. are selectively smoothed. If the outline is extracted from the smoothing process result ST1, only the edge component useful in the outline enhancement process is extracted with neither a fine luminance variation nor noise contained in the image (FIG. 6D). In accordance with the present embodiment, the edge component is extracted for enhancement using the non-linear filter, and the useful edge component only is used for outline enhancement in a manner different from the known art.

In accordance with the present embodiment, the amplifier 43 sets the degree of outline enhancement by level-adjusting the detected edge component OT1, and the adder 44 adds the edge component OT1 to the other component. The adder 44 thus generates the luminance data Y4 with the outline enhanced.

In accordance with the present embodiment, the separator 15 subtracts the smoothing process result with the edge component preserved from the original luminance data Y1, thereby detecting the high-frequency component TX1 other than the edge component. The high-frequency component TX1 without the edge component may be a pattern in the image, and is in need of setting of contact and sharpness. The high-frequency component TX1 without the edge component is level-adjusted by the amplifier 41, and is then added to the other components by the adder 44. The contrast and sharpness of the image are thus improved.

Since the edge component and the high-frequency component without the edge component are separately level-adjusted, a variety of enhancement processes may be performed to improve image quality in a manner different the known art. A wide variety of freedom of image quality setting is assured in comparison with the known art.

The adder 44 may add the smoothing process result with the edge component preserved output from the separator 15, instead of the original luminance data Y1, as an addend. A mechanism for assuring timing synchronization with a variety of data to be added by the adder 44 is thus simplified, and the entire structure of the apparatus is simplified accordingly.

The separator 15 smoothes the luminance data Y1 with the edge component thereof preserved. In the separator 15 (FIG. 3), the horizontal-direction component extractor 18 in the horizontal-direction processor 16 selects the luminance data at a target sampling point for the smoothing process and the luminance data at a sampling point adjacent to the target sampling point, the non-linear filter 31 as an $\epsilon$ filter (FIG. 4) processes these units of luminance data, thereby performing the smoothing process with the edge component preserved.

In the separator 15, the vertical-direction component extractor 19 of the horizontal-direction processor 16 selects the luminance data at a plurality of sampling points adjacent to the sampling point in a vertical direction, and the absolute difference calculator 22 detects the magnitude of a variation in the sample value in a vertical direction from the luminance data selected by the vertical-direction component extractor 19. In response to the detection result, the reference value setter 23 sets a reference value $\epsilon 1$ related to the smoothing process of the non-linear filter 31 so that the magnitude of the variation in the sample value in a vertical direction is preserved. The smoothing process is performed to preserve the edge component with characteristic of the non-linear filter 31 adaptively switched in response to the magnitude of the variation in the sample value in a vertical direction. The smoothing process is thus appropriately performed with the reference value $\epsilon 1$ set in response to the video data to be processed.

To perform the smoothing process in this way, the mixing ratio detector 32 sets a reference value $\epsilon 2$ with respect to the reference value $\epsilon 1$ that has been set in response to the magnitude of the variation in a vertical direction. The magnitude of a variation in the sample value in a horizontal direction using the reference value $\epsilon 2$, and the weak edge is detected based on the magnitude of the variation in the sample value in the horizontal direction. If there is a weak edge, the mixer 33 selects the original luminance data Y1. If there is no weak edge, the mixer 33 switches a weight averaging process of the luminance data Y1 and the output data S3 from the non-linear filter 31 in a manner such that the output data of the non-linear filter 31 is intensified in response to an increase in the magnitude of the variation in the sample value in a horizontal direction.

In succession to the horizontal smoothing process, a vertical smoothing process is performed on the luminance data Y1 with the edge component preserved. In the above-described embodiment, the luminance data Y1 is smoothed with the edge component of even a weak edge preserved. The outline enhancement process using the luminance data ST1 as the smoothing process reliably enhances an outline having a weak edge. Image quality is thus improved.

In accordance with the above-described embodiment of the present invention, the input video data is smoothed with the edge component preserved, the edge component is then removed from the smoothed video data, and the level adjustment is performed on the resulting video data. The outline enhancement is thus performed in a manner free from image degradation.

The reference value is set based on the variation in the sample values at adjacent sampling points in a horizontal direction and a vertical direction. The non-linear smoothing process is performed in a horizontal direction and a vertical direction with a variation in the signal level above the reference value being preserved. The smoothing process result and the input video data are weight averaged using the weight coefficient set based on the weak edge detection result to perform a series of smoothing processes. The outline enhancement is thus reliably performed on a weak edge. Image quality is thus improved.

In the above-described embodiment, the edge component having undergone the level adjustment and the high-frequency component containing no edge component are added to the smoothing process result with the edge component preserved therewithin. The present invention is not limited to this method. Alternatively, the edge component having undergone the level adjustment and the high-frequency component containing no edge component may be added directly to the input video data.

In accordance with the above-described embodiment of the present invention, the video data is smoothed in a vertical direction using the non-linear smoothing filter after being smoothed in a horizontal direction. The present invention is not limited to this method. Alternatively, the video data may be smoothed in a horizontal direction after being smoothed in a vertical direction.

In accordance with the above-described embodiment, the smoothing process result and the input video data are weight averaged and then output, and the weight coefficients for use in the weight averaging process are switched depending on the detection result of the weak edge component. The present invention is not limited to this method. If sufficient performance is practically attained, the weight averaging process may be omitted, and the smoothing process result may be directly output.

In accordance with the above-described embodiment of the present invention, the reference value for use in the non-linear smoothing process is adaptively switched. The present invention is not limited to this method. If sufficient performance is practically attained, the smoothing process may be performed with a fixed reference value.

In accordance with the above-described embodiment of the present invention, an $\epsilon$ filter is used in the smoothing process. The present invention is not limited to the $\epsilon$ filter. A wide variety of filters performing the smoothing process with the edge component preserved can be used.

In each of the above-described embodiments, the luminance data is used in the outline enhancement. The present invention is not limited to this method. Color difference data may be used. Alternatively, the input video data may be processed at the color data phase thereof.

In each of the above-described embodiments, the image pickup apparatus processes video data as an image pickup result. The present invention is not limited to the process of the video data as an image pickup result. For example, the present invention is also applicable to image processing by using a variety of video apparatuses including a television receiver, and a digital versatile disk (DVD) recorder, or by executing a program on a computer. When the present invention is applied to the program to be executed on the computer, the program may be installed beforehand onto the computer or may be supplied to the computer in a variety of recording media including an optical disk, a magneto-optical disk, or a memory card, or may be downloaded to the computer via a network such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a non-linear smoother for smoothing input video data with an edge component thereof preserved, and outputting smoothed video data;
    a subtractor for subtracting the smoothed video data from the input video data and outputting high-frequency component video data not containing the edge component;
    an outline extractor for extracting the edge component from the smoothed video data and outputting edge component video data;
    a first amplifier for varying a signal level of the edge component video data;
    a second amplifier for varying a signal level of the high-frequency component video data not containing the edge component; and
    an adder for adding video data output from the first amplifier and video data output from the second amplifier to one of the smoothed video data and the input video data.

2. The image processing apparatus according to claim 1, wherein the non-linear smoother comprises:
    a first non-linear filter for performing a non-linear smoothing process on the input video data in one of a horizontal direction and a vertical direction by setting a reference value based on a variation in sample values of the input video data at adjacent sampling points in one of a horizontal direction and a vertical direction and preserving a variation in the signal level higher in value than the reference value;
    a first edge detector for detecting a weak edge in the input video data in one of a horizontal direction and a vertical direction;
    a first mixer for weight averaging output data output from the first non-linear filter and the input video data based on the detection result of the first edge detector and outputting weight-average output;
    a second non-linear filter for performing a non-linear smoothing process on the output data from the first mixer in one of a horizontal direction and a vertical direction by setting a reference value based on a variation in sample values of the output data from the first mixer at adjacent sampling points in one of a horizontal direction and a vertical direction and preserving a variation in the signal level higher in value than the reference value;
    a second edge detector for detecting a weak edge in the output data from the first mixer in one of a horizontal direction and a vertical direction; and
    a second mixer for weight averaging output data from the second non-linear filter and the output data from the first mixer based on the detection result from the second edge detector.

3. An computer implemented image processing method comprising steps of:
    using at least a processor of the computer to:
        smooth input video data with an edge component thereof preserved, and output smoothed video data;
        subtract the smoothed video data from the input video data and output high-frequency component video data not containing the edge component;
        extract the edge component from the smoothed video data and output edge component video data;
        vary in level the edge component video data;
        vary in level the high-frequency component video data not containing the edge component; and
        add the level-varied edge component video data and the level-varied high-frequency component video data not containing the edge component to one of the smoothed video data and the input video data.

4. A non-transitory computer-readable storage medium storing a computer program, which when executed by a computer performs a method, the method comprising steps of:
    smoothing input video data with an edge component thereof preserved, and outputting smoothed video data;
    subtracting the smoothed video data from the input video data and outputting high-frequency component video data not containing the edge component;
    extracting the edge component from the smoothed video data and outputting edge component video data;
    varying in level the edge component video data; varying in level the high-frequency component video data not containing the edge component; and
    adding the level-varied edge component video data and the level-varied high-frequency component video data not containing the edge component to one of the smoothed video data and the input video data.

5. A non-transitory recording medium storing a computer program for causing a compute to process input image data, the computer program comprising steps of:
    smoothing input video data with an edge component thereof preserved, and outputting smoothed video data;
    subtracting the smoothed video data from the input video data and outputting high-frequency component video data not containing the edge component;
    extracting the edge component from the smoothed video data and outputting edge component video data;
    varying in level the edge component video data; varying in level the high-frequency component video data not containing the edge component; and
    adding the level-varied edge component video data and the level-varied high-frequency component video data not containing the edge component to one of the smoothed video data and the input video data.

* * * * *